United States Patent
Kaszas

(10) Patent No.: US 9,133,281 B2
(45) Date of Patent: Sep. 15, 2015

(54) PREPARATION AND USE OF FUNCTIONALIZED ELASTOMERS IN RUBBER COMPOSITIONS CONTAINING SILICA FILLER AND TIRE COMPONENTS THEREOF

(71) Applicant: The Goodyear Tire & Rubber Company, Akron, OH (US)

(72) Inventor: Gabor Kaszas, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 68 days.

(21) Appl. No.: 13/690,104

(22) Filed: Nov. 30, 2012

(65) Prior Publication Data

US 2014/0155542 A1     Jun. 5, 2014

(51) Int. Cl.
| | |
|---|---|
| *B60C 1/00* | (2006.01) |
| *C08L 9/00* | (2006.01) |
| *C08L 9/06* | (2006.01) |
| *C08K 3/36* | (2006.01) |
| *C08C 19/25* | (2006.01) |

(52) U.S. Cl.
CPC ............... *C08C 19/25* (2013.01); *B60C 1/0016* (2013.04); *C08K 3/36* (2013.01); *C08L 9/00* (2013.01); *C08L 9/06* (2013.01)

(58) Field of Classification Search
CPC .......... C08C 19/42; C08C 19/25; C08K 5/15; C08K 3/36; C08F 8/32; B60C 1/0016; C08L 9/06; C08L 9/00
USPC ................................. 524/114, 506, 572, 493
See application file for complete search history.

(56) References Cited

U.S. PATENT DOCUMENTS

| | | | |
|---|---|---|---|
| 5,087,668 A | 2/1992 | Sandstrom et al. ........... 525/237 |
| 5,698,619 A * | 12/1997 | Cohen et al. ................... 524/188 |
| 7,473,724 B2 * | 1/2009 | Hsu et al. ....................... 524/114 |
| 2010/0144954 A1* | 6/2010 | Kikuchi et al. ................ 524/506 |

FOREIGN PATENT DOCUMENTS

| | | | |
|---|---|---|---|
| JP | 0657767 | 8/1988 | .............. C08C 19/42 |
| JP | 0653768 | 7/1994 | .............. C08C 19/42 |

* cited by examiner

*Primary Examiner* — Angela C Scott
(74) *Attorney, Agent, or Firm* — Henry C. Young, Jr.

(57) ABSTRACT

This invention relates to preparation and use of in situ functionalized elastomers in a rubber composition, namely post polymerization functionalization of elastomers, in rubber compositions containing precipitated silica filler reinforcement and tires having components thereof.

12 Claims, 4 Drawing Sheets

PREPARATION AND USE OF FUNCTIONALIZED ELASTOMERS IN RUBBER COMPOSITIONS CONTAINING SILICA FILLER AND TIRE COMPONENTS THEREOF

FIELD OF THE INVENTION

This invention relates to preparation and use of in situ functionalized elastomers in a rubber composition, namely post polymerization functionalization of elastomers, in rubber compositions containing precipitated silica filler reinforcement and tires having components thereof.

BACKGROUND OF THE INVENTION

Thermal oxidation of conjugated diene-based elastomers occurs during high temperature high shear mixing of the elastomers to result in a formation of oxidative components on the elastomer which are randomly distributed along the polymer chain. Representative of such resulting oxidative components are, for example, various aldehydes, ketones and epoxides.

It is a purpose of this invention to utilize such thermally oxidation formed components to form functionalization of such elastomers with functional groups pendent from and distributed along the elastomer chain.

To achieve such functionalization it is proposed to react a compound with such oxidative components on the elastomer chain having a general structure, or formula: (I):

$$X-R-Y \quad (I)$$

where X represents a group reactive with at least one of said oxidative components on said elastomer chain, Y represents a group reactive with hydroxyl groups (e.g. silanol groups) on precipitated silica (a synthetic amorphous silica) and R is a group connecting X and Y.

Representative examples of X are, for example, primary amines, secondary amines, alkyl hydrazines, aryl hydrazines, hydroxyl amines, carboxylic acids, aryl alcohols and aryl thiols. Representative of Y is, for example, an alkoxysilane group. In general Y can be defined as —$SiZ_3$ where Z is comprised of OR, Cl, $NMe_2$, SR, OC(=O)R or mixture thereof wherein R represents an alkyl group.

Representative of R is, for example, alkanediyl, benzenediyl, and cycloalkanediyl groups.

A representative example of such compound for such elastomer functionalization is, for example, an organoaminoalkoxysilane.

For such compound, its amine component (X component of formula I) can react with the aforesaid oxidation formed components of the elastomer and its alkoxysilane component (Y component of formula I) can react with hydroxyl groups (e.g. silanol groups) of the precipitated silica to promote a rubber-silica interaction with its organo portion (the R component of formula I) being, for example, propanediyl. In this manner, then a coupling of the precipitated silica to the elastomer can be promoted to create a reinforcement effect of the precipitated silica for the elastomer.

It is considered that such created elastomer-precipitated silica interaction can be used in addition to or as an alternative to use of a sulfur-containing organoalkoxysilane compound (e.g. bis(3-triethoxysilylpropyl)) polysulfide having an average in a range of from 2 to 4 connecting sulfur atoms in its polysulfidic bridge)) which have heretofore been used as reactive coupling agents between diene-based elastomers and precipitated silica for promoting rubber-silica filler interaction and thereby various improved physical properties of rubber compositions.

Historically, use of aminosilane compounds has been previously proposed in combination with sulfur-containing organosilicon compounds for silica filled conjugated diene-based rubber compositions. For example, see U.S. Pat. No. 5,698,619.

However, for this invention, it has been discovered that a specialized procedure, or method, of functionalizing the conjugated diene-based elastomer(s) in situ within the rubber composition with an organoaminosiloxane can enable a more effective functionalization of the elastomer.

It is to be appreciated that in the manufacture of various rubber articles, rubber compositions (e.g. rubber compositions containing conjugated diene based elastomers) typically contain at least one of rubber reinforcing carbon black and precipitated silica filler reinforcement to attain desired physical and chemical characteristics. The interaction between rubber and the reinforcing filler (rubber-filler interaction) in such rubber compositions has a profound effect on the physical properties of vulcanizates (the vulcanized rubber composition). The interaction between the rubber and the filler regulates the degree of dispersion of the filler, the formation of elastomer-filler interface, and the filler-filler network within the rubber composition. All of these interactions have a significant effect on the physical properties of the cured rubber composition, such as, for example, stress-strain properties, energy loss under dynamic cyclic load, abrasion resistance, and tear propagation resistance. Increased rubber-filler interaction promotes dispersion of the filler within the rubber composition to a greater degree to thereby promote a higher level of rubber reinforcement. It can also promote an incorporation of higher amounts of the reinforcing filler within the rubber composition of which disperse into conventional rubbers with difficulty.

The importance of attaining better rubber/filler interaction has been appreciated for many years and has been the subject of numerous research projects throughout the rubber industry and within academic settings. Attaining improved rubber/filler interaction is of particular interest to manufacturers of rubber products such as tires, hoses, power transmission belts, conveyor belts, windshield wiper blades, and a multitude of other industrial rubber products and consumer goods.

One recognized approach for attaining better compatibility between rubbery polymers and fillers is to initiate or terminate polymerization using an initiator or a terminating agent which contains a filler reactive group. This approach is largely limited to anionic living polymerization.

Another recognized approach is to use a small amount of comonomer which carries a filler reactive group in the synthesis of the desired polymer.

Both of such approaches have several drawbacks. The functional initiator, terminating agent or monomer has to be synthesized and it has to be separated from byproducts if a high purity requirement of a polymerization process is desired. Functional group carrying initiators or monomers have to be stable at the polymerization temperature and should not cause undesired chain transfer or termination reaction. Functional monomers have to a have a suitable reactivity with the other monomers in order to incorporate them in a uniform manner into the polymer chain and it is usually desired that they not slow down the polymerization process significantly. Frequently a portion of the functional initiator, terminating agent or monomer has to be protected and after the synthesis of the polymer the protecting groups have to be removed. Functional groups should be stable during the finishing as well as the storage of the polymer. Therefore it is highly desirable to develop a method which permits the functionalization of the polymer after polymerization and preferentially in situ within the rubber composition during the mixing of the polymer with the reinforcing filler, particularly precipitated silica, and other ingredients.

Without intending to be bound by theory, as previously indicated, it is believed that the in situ elastomer functionalization method of this invention is based on the following reaction mechanism. Attachment of precipitated silica filler reactive aminosilane groups to the elastomer chain is based on two consecutive steps. In the first step oxygen containing reactive groups, such as one or more of aldehydes, ketones and epoxides, form along the chain due to the thermal oxidation of the polymer in the mixer via a free radical mechanism. Subsequently the amino group of the organoaminoalkoxysilanes chemically reacts with these oxygen containing entities resulting in elastomer chain bound alkoxysilane groups. Parallel with these reactions, condensation of the alkoxysilane groups with the hydroxyl groups on the precipitated silica surface takes place. The end result of these consecutive and parallel reactions is the formation of chemical bond between the elastomer chain and the precipitated silica surface to thereby promote the elastomer-filler interaction.

As free radicals and peroxides are considered to actively play an important role in the formation of the amine reactive oxygenated structures to promote the aforesaid elastomer-filler interaction, it is important that certain stabilizers should not be present during the aforesaid elastomer functionalization reaction. Representative examples of such unwanted stabilizers during the amine-based elastomer functionalization are stable free radicals such as, for example, 2,2-diphenyl-1-picrylhydrazyl (DPPH) or 2,2,6,6-tetramethyl-1-piperidinyloxy (TEMPO), nitroxy radical forming amine or hindered amine type stabilizers such as N-1,3-dimethyl butyl, N'-phenyl paraphenylene diamine (6PPD) or derivatives of 2,2,6,6-tetramethyl piperidine. Peroxide decomposing secondary stabilizers should also be avoided such as tris-nonylphenyl phosphites or thioethers. Contrarily, on the other hand, phenolic type (phenolic based) stabilizers have no significant effect on the functionalization reaction. Representative of such phenolic stabilizers is butylated hydroxytoluene (BHT). This may be due to, for example, a decomposition of alkylperoxycyclohexadienones at mixing temperatures exceeding 110° C.

In one aspect, as previously indicated, preparation and use of aminosilane functionalized elastomers are proposed in U.S. Pat. No. 5,698,619 for use with silica-filled rubber compositions.

However, it has been discovered that primary and secondary amines can disadvantageously and significantly interfere with functionalization of elastomers with organoaminoalkoxysilanes in a sense of retarding the functionalization process itself and, also, in the sense of the primary and secondary amines competing with the amino group of the aminosilane for preferentially reacting with the elastomer(s). Such primary and secondary amines particularly include amine type (amine based) stabilizers (antidegradants) used in rubber compositions such as, for example, N-1,3-dimethyl butyl, N'-phenyl paraphenylene diamine.

For this invention, functionalization of elastomers with organoaminoalkoxysilanes is to be accomplished in the absence of primary and secondary amine compounds either by pre-forming the organoaminoalkoxysilane functionalized elastomer(s) prior to addition to the elastomer or, more desirably in an alternative, by reacting the organoaminoalkoxysilane with the elastomer(s) in situ within the rubber composition, in the absence of primary and secondary amine compounds. If desired, primary and/or secondary amines may be added to the rubber composition following the reaction of the organoaminoalkoxysilane with the elastomer(s).

In the description of this invention, the term "phr" where used relates to parts by weight of an ingredient per 100 parts by weight of rubber, unless otherwise indicated.

The terms "rubber" and "elastomer" may be used interchangeably unless otherwise indicated. The terms "vulcanized" and "cured" may be used interchangeably unless otherwise indicated. The terms "compound" and "rubber composition" may be used interchangeably unless indicated.

SUMMARY AND PRACTICE OF THE INVENTION

In accordance with this invention a method of preparing a rubber composition comprises:

(A) providing a blend comprised of, based on parts by weight per 100 parts by weight rubber (phr):
  (1) at least one sulfur vulcanizable diene-based elastomer, wherein said at least one of said diene-based elastomer(s) contains oxidative components randomly distributed on its elastomer chain comprised of at least one of aldehydes, ketones and epoxides;
  (2) from about 30 to about 150, alternately from about 35 to about 120, phr of reinforcing filler comprised of:
    (a) amorphous synthetic silica (e.g. precipitated silica), or
    (b) a combination of precipitated silica and rubber reinforcing carbon black which contains at least about 30 phr of precipitated silica, together with a silica coupler for said precipitated silica having a moiety reactive with hydroxyl groups (e.g. silanol groups) on said precipitated silica and another, different, moiety interactive with said diene-based elastomer(s), (B) functionalizing at least one of said diene-based elastomers containing said oxidative components with a functionalizing compound having a moiety capable of reacting with at least one of said oxidative components on said polymer chain and another different moiety capable of reacting with hydroxyl groups (e.g. silanol groups) on said precipitated silica by:
  (1) pretreatment of said elastomer(s) with said functionalizing compound to form a functionalized elastomer thereof followed by addition of said functionalized elastomer to said rubber composition, or
  (2) treatment of said elastomer(s) with said functionalizing compound in situ within said rubber composition to form a functionalized elastomer;

wherein said functionalizing of said elastomer(s) is conducted in the absence of competing compound(s) comprised of:
  (3) compound(s) containing at least one of primary and secondary amine groups (e.g. aforesaid amine based antidegradants for diene-based elastomers),
  (4) compound(s) containing stable free radicals (e.g. 2,2,6,6-tetramethyl-1-piperidinyloxy and 2,2-diphenyl-1-picrylhydrazyl), and
  (5) compound(s) containing peroxide decomposing moieties (e.g. tris-nonylphenyl phosphites or thioethers;

(C) Blending with said rubber composition containing said functionalized elastomer(s) at least one compound comprised of:
  (1) compound(s) containing at least one of primary and secondary amine groups (e.g. antidegradant for said elastomer), (2) compound(s) containing stable free radicals (e.g. 2,2,6,6-tetramethyl-1-piperidinyloxy), and (3) compound(s) containing peroxide decomposing moieties (e.g. tris-nonylphenyl phosphites or thioethers;

In further accordance with this invention said functionalizing compound has a general structural formula: (I):

X—R—Y  (I)

where X represents a group reactive with at least one of said oxidative components on said elastomer chain, Y represents a group reactive with hydroxyl groups (e.g. silanol groups) on said precipitated silica (a synthetic amorphous silica) and R is a group connecting X and Y;

wherein X is comprised of at least one of primary amines, secondary amines, alkyl hydrazines, aryl hydrazines, hydroxyl amines, carboxylic acids, aryl alcohols and aryl thiols; Y is an alkoxysilane group comprised of —$SiZ_3$ where Z is comprised of at least one of OR, Cl, $NMe_2$, SR and OC(=O)R radicals; and R is comprised of at least one of alkyl, alkanediyl, benzenediyl, and cycloalkanediyl groups.

In practice, it is envisioned that the X component of the Formula I can react with the aforesaid oxidation formed components of the elastomer and its Y component can react with hydroxyl groups (e.g. silanol groups) of the precipitated silica to promote rubber-silica interaction with its organo portion (the R component of formula I). In this manner, then a coupling of the precipitated silica to the elastomer can be promoted to create a forcement effect of the precipitated silica for the elastomer.

In additional accordance with this invention, said functionalizing compound is comprised of an organoaminoalkoxysilane (e.g. in an amount of, for example, from about 0.05 to about 10, alternately from about 0.1 to about 5 phr).

Said organoaminoalkoxysilane may have, for example, the structural formula (II):

wherein $R^1$, $R^2$ and $R^3$ are independently selected from the group consisting of alkoxy radicals having from 1 to 8 carbon atoms, alkyl radicals having from 1 to 8 carbon atoms and aryl radicals having 6 carbon atoms, with the proviso that at least one of $R^1$, $R^2$ and $R^3$ is an alkoxy radical; $R^4$ is selected from the group consisting of alkylene groups having from 1 to 18 carbon atoms and arylene and alkyl-substituted arylene groups having from 6 to 10 carbon atoms; and $R^5$ is selected from the group consisting of hydrogen and alkyl groups having from 1 to 15 carbon atoms, and wherein n is an integer of from 2 to 8, and subsequently blending therewith, in a final mixing step (e.g. at a temperature to about 100° C. to about 130° C. for a time of about 1 to about 3 minutes) sulfur curative comprised of elemental sulfur (e.g. in an amount of from about 0.5 to about 3 phr thereof).

Preferably at least one of $R^1$, $R^2$ and $R^3$ is an ethoxy radical and, in one embodiment, all of $R^1$, $R^2$ and $R^3$ are ethoxy radicals.

Preferably $R^4$ is an alkylene group which, in one embodiment can contain from 1 through 8 carbon atoms.

Preferably $R^5$ is hydrogen.

Representative of various organoaminoalkoxysilanes are, for example, aminopropyl triethoxysilane as well as trimethoxysilyl ethyl amine, triethoxysilyl ethyl amine, tripropoxysilyl ethyl amine, tributoxysilyl ethyl amine, trimethoxysilyl propyl amine, triethoxysilyl propyl amine, tripropoxysilyl propyl amine, triisopropoxysilyl propyl amine, tributoxysilyl propyl amine, trimethoxysilyl butyl amine, triethoxysilyl butyl amine, tripropoxysilyl butyl amine, tributoxysilyl butyl amine, trimethoxysilyl pentyl amine, triethoxysilyl pentyl amine, tripropoxysilyl pentyl amine, tributoxysilyl pentyl amine, trimethoxysilyl hexyl amine, triethoxysilyl hexyl amine, tripropoxysilyl hexyl amine, tributoxysilyl hexyl amine, trimethoxysilyl heptyl amine, triethoxysilyl heptyl amine, tripropoxysilyl heptyl amine, tributoxysilyl heptyl amine, trimethoxysilyl octyl amine, triethoxysilyl octyl amine, tripropoxysilyl octyl amine, tributoxysilyl octyl amine, and the like.

Desirably, the organoaminoalkoxysilane is comprised of triethoxysilyl propyl amine. In one aspect, it is understood that such triethoxysilyl propyl amine may be available as 'A-1100™ from Witco Corporation, OSi Specialties Group.

Representative of the aforesaid competing compound(s), most of which are previously mentioned, are:

(A) compound(s) containing at least one of primary and secondary amine groups such as for example amine based antidegradants for diene-based elastomers representative of which are, for example amine based antidegradants found in the *Vanderbilt Rubber Handbook* (1978), Pages 384 through 387, representative of which are, for example, and not intended to be limiting, N-1,3-dimethyl butyl, N'-phenyl paraphenylene diamine and diphenyl-p-phenylene diamine and derivatives of 2,2,6,6-tetramethyl piperidine;

(B) compound(s) containing stable free radicals representative of which are, for example, and not intended to be limiting, 2,2,6,6-tetramethyl-1-piperidinyloxy and 2,2-diphenyl-1-picrylhydrazyl;

(C) compound(s) containing peroxide decomposing moieties, representative of which are, for example, and not intended to be limiting, tris-nonylphenyl phosphites, and thioethers.

In further accordance with this invention, a rubber composition containing precipitated silica and functionalized diene-based elastomer(s) is provided which may for example, be prepared by the method of this invention.

In one embodiment of the invention, the precipitated silica reinforced rubber composition containing the functionalized elastomer(s) is provided as a sulfur cured rubber composition.

In further accordance with this invention a tire having a component comprised of said precipitated silica reinforced rubber composition containing the functionalized elastomer(s) is provided.

Representative of the aforesaid conjugated diene-based elastomers are, for example, polymers of at least one of isoprene and 1,3-butadiene and copolymers of styrene and at least one of isoprene and 1,3-butadiene.

Representative of such diene-based elastomers are, for example, cis 1,4-polyisoprene (natural and synthetic) elastomer, cis 1,4-polybutadiene elastomer, isoprene/butadiene elastomers, styrene/butadiene elastomers and styrene/isoprene/butadiene elastomers.

As indicated, the present invention may be used with sulfur-vulcanizable, diene-based elastomers (elastomers containing olefinic unsaturation). The phrase "rubber" "diene-based elastomers" or "elastomer-containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art.

In one aspect the rubber (elastomers is at least two diene-based elastomers (rubbers). For example, a combination of two or more rubbers may be desirable as a combination of at least two rubbers comprised of cis 1,4-polyisoprene rubber (natural or synthetic, although natural is preferred), styrene/isoprene/butadiene rubber, solution polymerization derived styrene/butadiene rubbers and cis 1,4-polybutadiene rubbers.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

A 3,4-polyisoprene rubber (3,4-PI), if used, is considered beneficial for a purpose of enhancing the tire's traction when it is used in a tire tread composition. The 3,4-PI and use thereof is more fully described in U.S. Pat. No. 5,087,668 which is incorporated herein by reference. The $T_g$ refers to the glass transition temperature which can conveniently be determined by a differential scanning calorimeter at a heating rate of 10 to 20° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The organoaminoalkoxysilane compounds used in the present invention may be added to the rubber by any conventional technique such as on a mill or in a Banbury® internal rubber mixer and the amount may vary widely depending on the type of rubber, so long as they are added exclusive of or prior to any primary or secondary amine containing compound. Generally, the amount of the organoaminoalkoxysilane, as hereinbefore pointed out, is in a range of from about 0.05 to about 10 phr with a range of 0.1 to about 5 phr being more preferred. For the in situ modification of the elastomer(s), the organoaminoalkoxysilane is usually added in the nonproductive mixing stage for the rubber composition together with the silica and the silica coupler.

For ease in handling, the organoaminoalkoxysilane compound may be used per se or may be deposited on suitable carriers. Examples of carriers which may be used in the present invention include silica, carbon black, alumina, alumina silicates, clay, kieselguhr, cellulose, silica gel and calcium silicate. It can also be mixed with the processing oil.

The rubber composition should contain a sufficient amount of reinforcing filler such as precipitated silica, and rubber reinforcing carbon black, if used, to contribute a reasonably high modulus and high resistance to tear. The reinforcing filler may be used in an amount in a range of, for example, from about 20 to about 150 phr. The precipitated silica may be present, for example, in a range of from about 15 to about 120 phr, as may be appropriate. If carbon black is also present, the amount of rubber reinforcing carbon black, if used, may vary as may be appropriate. Generally speaking, the amount of rubber reinforcing carbon black may vary, for example, from about 2 to 80 phr, or even up to 110 phr.

Where the rubber composition contains both silica (e.g. precipitated silica) and carbon black (namely rubber reinforcing carbon black), as previously indicated, the weight ratio of silica to carbon black may vary. For example, the weight ratio may be as low as 1:5 up to a silica to carbon black weight ratio of 30:1. Usually, the weight ratio of silica to carbon black ranges from 1:3 to 20:1. The combined weight of the silica and carbon black, as herein referenced, may range from about 20 to about 150 phr, alternately from about 40 to about 120 phr.

The commonly employed siliceous pigments used in rubber compounding applications can be used as the silica in this invention, including pyrogenic and precipitated siliceous pigments (silica) and alumin0osilicates, although precipitated silicas (amorphous synthetic precipitated silica) are preferred. The siliceous pigments usually employed in this invention are precipitated silicas such as, for example, those obtained by the acidification of a soluble silicate, e.g., sodium silicate.

Such silicas might have a BET surface area, as measured using nitrogen gas in a range, for example, of about 40 to about 600, and more usually in a range of about 50 to about 300 square meters per gram. The BET method of measuring surface area is described in the *Journal of the American Chemical Society*, Volume 60, Page 309 (1938).

The silica may have a dibutylphthalate (DBP) absorption value, for example, in a range of about 100 to about 400, and more usually about 150 to about 300 cc/100 g.

Various commercially available silicas may be considered for use in this invention such as, only for example herein, and without limitation, silicas commercially available from PPG Industries under the Hi-Sil trademark with designations 210, 243, etc; silicas available from Rhodia, with, for example, a designations of Zeosil™ 1165MP and silicas available from Degussa AG with, for example, designations of, for example, VN2, VN3, BV3380GR, etc, and silicas available from Huber, for example Huber Sil 8745.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur-vulcanizable and sulfur-vulcanized material (rubbers), the additives mentioned above are selected and commonly used in conventional amounts. Typical amounts of reinforcing-type carbon blacks(s), for this invention, if used, are herein set forth. Representative examples of sulfur donors include elemental sulfur (free sulfur), an amine disulfide, polymeric polysulfide and sulfur olefin adducts. Preferably, the sulfur-vulcanizing agent is elemental sulfur. The sulfur-vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants comprise about 1 to 5 phr. Typical amounts of fatty acids, if used, which can include stearic acid, comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

In one aspect of the present invention, the sulfur-vulcanizable rubber composition is then sulfur-cured or vulcanized.

Accelerators are used to control the time and/or temperature required for vulcanization and to improve the properties of the vulcanizate. In one embodiment, a single accelerator system may be used; i.e., primary accelerator. The primary accelerator(s) may be used in total amounts ranging from about 0.5 to about 4, preferably about 0.8 to about 2.0, phr. In another embodiment, combinations of a primary and a secondary accelerator might be used with the secondary accelerator being used in a smaller, equal or greater amount to the primary accelerator. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example, the ingredients are typically mixed in at least two stages, namely at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber, silica, the combination of the aminosilane and the sulfur-containing organosilicon compound and carbon black, if used, are mixed in one or more non-productive mix stages. The terms "non-productive" and "productive" mix stages are well known to those having skill in the rubber mixing art. The non-productive sulfur-vulcanizable rubber composition containing the aminosilane of formula I, vulcanizable rubber and generally at least part of the silica, as well as the sulfur-containing organosilicon compound, may be subjected to a thermo mechanical mixing step. The thermo mechanical mixing step generally comprises a mechanical working in a mixer or extruder for an extended period of time at a rubber temperature between 140° C. and 190° C. The appropriate duration of the thermo mechanical working varies as a function of the operating conditions and the volume and nature of the components and the final properties of the compounded rubber desired. For example, the thermo mechanical working may be from 1 to 20 minutes.

In one aspect of the invention, such process is provided wherein said preparatory mixing is conducted with at least two thermo mechanical mixing steps to a temperature in a range of about 140° C. to about 190° C., with intermediate cooling of the rubber composition between at least two of said mixing steps to a temperature below about 50° C.

In further accordance with the invention, the process comprises the additional step of vulcanizing the prepared rubber composition at a temperature in a range of about 100° C. to about 200° C.

Accordingly, the invention also thereby contemplates a vulcanized rubber composition prepared by such process.

In additional accordance with the invention, the process comprises the additional steps of preparing an assembly of a tire or sulfur-vulcanizable rubber with a tread comprised of the said rubber composition prepared according to the process of this invention and vulcanizing the assembly at a temperature in a range of about 100° C. to about 200° C.

Accordingly, the invention also thereby contemplates a vulcanized tire prepared by such process.

Vulcanization of the rubber composition of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

Upon vulcanization of the sulfur-vulcanized composition, the rubber composition of this invention can be used for various purposes. For example, the sulfur-vulcanized rubber composition may be in the form of a tire, belt or hose. In case of a tire, it can be used for various tire components. Such tires can be built, shaped, molded and cured by various methods which are known and will be readily apparent to those having skill in such art. Preferably, the rubber composition is used in the tread of a tire. As can be appreciated, the tire may be a passenger tire, aircraft tire, truck tire and the like. Preferably, the tire is a passenger tire. The tire may also be a radial or bias, with a radial tire being preferred.

Improvement in polymer-filler (elastomer-filler) interaction and thereby reduction in filler-filler interaction is important to observe for the organoaminoalkoxysilane modification of elastomers for this invention. In the following examples (Examples 1 through 3) primarily two rheological measurement techniques are used to determine these effects in order to demonstrate increase in polymer-filler interaction resulting in a reduction of filler-filler interaction. One of these measurements is commonly referred to as "filler flocculation" measurement and the other is the measurement of the so called Payne effect, i.e., the strain dependence of modulus at relatively low strains.

The term "filler flocculation" refers to the increase of uncured compound (rubber composition) stiffness at a given temperature with time. This can be measured by monitoring the increase of torque or modulus during oscillatory shear measurement. Increase of compound stiffness (as well as electric conductivity of uncured carbon black reinforced compounds) upon storage or elevated temperatures is well known effect (see Bulgin, D., *Trans. Inst. Rubber Ind.*, 21, 188 (1945) and Fletcher, W. P., and Gent, A. N., *Trans. Inst. Rubber Ind.*, 29, 266 (1953)). It is generally attributed to the flocculation of the filler. The magnitude of this effect appears to increase with poorer dispersion of the reinforcing filler, increasing temperature or decreasing molecular weight (see Bohm, G. G. A., and Nguyen, M. N., *J. Applied Poly. Sci.*, 55, 1041 (1995)). Filler flocculation is strongly effected by the type of the filler, filler surface treatment and in general polymer-filler interaction (see Lin, J., Hergenrother, W. L., Alexanian, E., and Bohm, G. G. A., *Rubber Ckem. & Techn.*, 75, 865 (2002) and Lin, J., Hogan, T. E., and Hergenrother, W. L., Paper No. 58, presented at a meeting of the Rubber Division, American Chemical Society, San Francisco, Calif., on Apr. 28 through 30, 2003). Increasing polymer-filler interaction reduces the rate of flocculation by restricting aggregate movement and/or formation of additional polymer bridges between aggregates (see Schwartz, G. A., Cerveny, S., Marzocca, A. J., Gerspacher, M., and Nikiel, L., *Polymer* 44, 7229 through 7240 (2003)). Therefore, measurement of compound stiffness provides an assessment of the filler-polymer and filler-filler interaction. Reduced increase of S' with time indicates stronger polymer-filler (weaker filler-filler) interaction.

The Payne effect of a rubber composition is also important to observe for the organoaminoalkoxysilane modification of elastomers for this invention in a sense of measuring the extent of filler-filler and filler-polymer interaction. A dramatic decrease of the modulus of a filler reinforced rubber composition (compound) as its strain is increased is referred to as a Payne effect. The Payne effect is a result of the work of A. R. Payne in this area (see Payne, A. R., *J. Appl. Polym. Sci.,* 6, 57 (1962)). This decrease in modulus with increase in strain of the rubber composition is generally associated with the breakdown and agglomeration of reinforcing filler particles within the rubber composition. Filler-matrix interactions are also thought to be contributing factors to the Payne effect. Such processes are the slippage of entanglements between bound rubber and the mobile rubber phase, molecular surface slippage or rearrangement and release of trapped rubber within the reinforcing filler network (see Heinrich, G., and Kluppel, M., *Advances in Polymer Science,* 160, 1436 through 5030 (2002) and Sternstein, S. S., and Zhu, Ai-Jun, *Macromolecules,* 35, 7262 through 7273 (2002) and Zhu, Ai-Jun, and Sternstein, S. S., *Composite Science and Technology,* 63, 1113 through 1126 (2003)). The magnitude of strain dependence of dynamic moduli increases with decreasing molecular weight and it is strongly reduced by increasing polymer-filler interaction, e.g., by the use of coupling agents (see Ulmer, J. D., Hergenrother, W. L., and Lawson, D. F., *Rubber Chem. & Techn.,* 71(4), 637 through 667 (1998) and Gauthier, C., Reynaud, E., Vassoille, R., and Ladouce-Stelandre, L., *Polymer,* 45, 2761-2771 (2003)).

For carbon black reinforced rubber compositions (where the reinforcing filler is rubber reinforcing carbon black), interaction between the carbon black particles (usually in a form of aggregates of the carbon black filler), namely filler-filler interaction, is weak as it is governed by Wan der Waals forces. In case of silica reinforced rubber composition, the filler-filler interaction is significantly stronger due to stronger polar-polar interaction and hydrogen bonding between silica particles (the filler-filler interaction). On the other hand polymer-filler interaction occurs spontaneously with carbon black filler reinforcement but only weakly in the case of silica filler reinforcement because of the large polarity difference between polymer and silica. For precipitated silica filler containing rubber compositions, in order to decrease filler-filler interaction, the precipitated silica surface is hydrophobated typically by the use of silane compounds which are reactive with hydroxyl groups contained on precipitated silica. However, hydrophobization alone apparently does not improve silica-polymer interaction significantly. Improvement in silica-polymer interaction is achieved by chemically bonding of polar, hydrogen bonding or silica reactive groups to the polymer chain on one hand or using hydrophobization agents (silane couplers) which create polymer-silica bonding during the cure of the rubber composition on the other hand.

BRIEF DESCRIPTION OF THE DRAWINGS

Drawings are provided to further illustrate an aspect of the invention relating to organoaminoalkoxysilane modification of elastomers in a sense of illustrating changes in the strain dependence of the modulus.

DESCRIPTION OF ACCOMPANYING DRAWINGS

Figure 1:
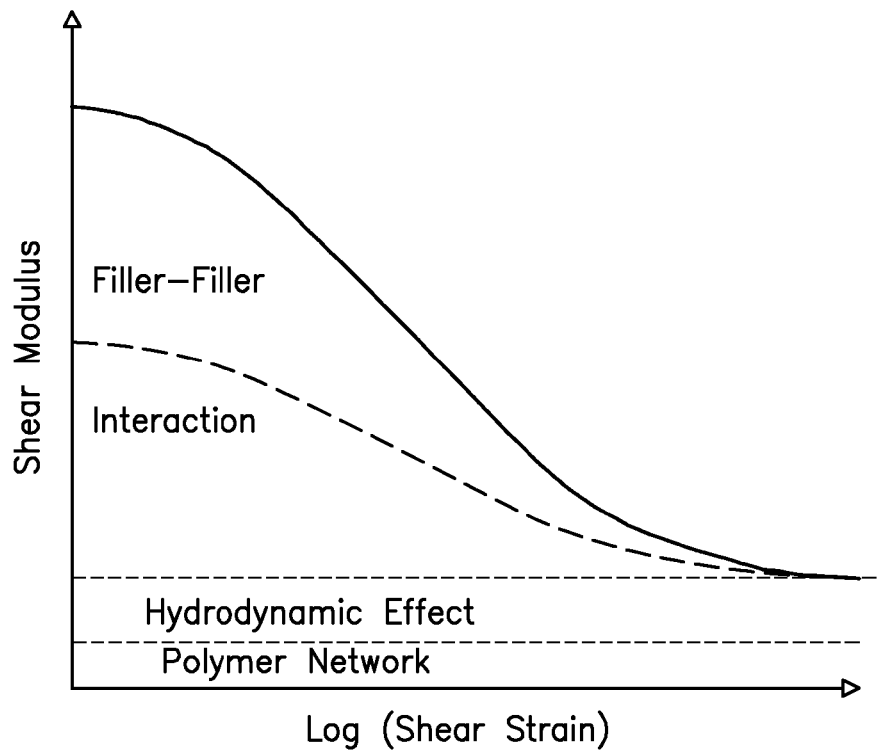
FIG. 1 (FIG. 1) relates to hydrophobization of the silica surface.
Figure 2:
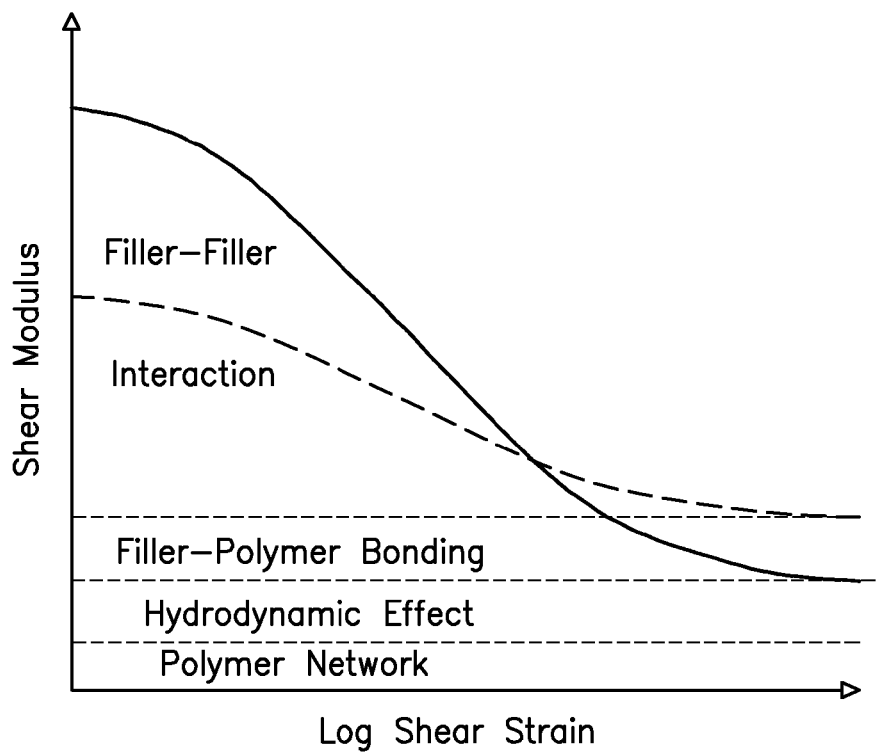
FIG. 2 (FIG. 2) relates to polymer-silica interaction of a precipitated silica reinforced elastomer composition.

The following drawings in a form of FIGS. 1 and 2 (FIG. 1 and FIG. 2) are provided to further illustrate an aspect of the invention relating to organoaminoalkoxysilane modification of elastomers in a sense of illustrating changes in the strain dependence of the modulus as a result of hydrophobization of the silica surface on one hand (FIG. 1) and increasing polymer-silica interaction of a precipitated silica reinforced elastomer composition on the other hand by chemically bonding of polar, hydrogen bonding or silica reactive groups to the polymer chain (FIG. 2).

FIG. 1 is a plot of Shear (G') Modulus (y axis) versus the Log of the Shear Strain (x axis). The black solid line is a schematic representation of the strain dependence of the G' modulus of an uncured precipitated silica filled elastomer composition in a relatively low strain range. The G' modulus has three components, polymer network, hydrodynamic effect and filler-filler interaction. The polymer network represents the contribution of the entangled polymer chains to the modulus. In a relatively low strain range this value is independent of the strain and starts to decrease at higher strains. The hydrodynamic effect represents the increase of the G' modulus associated with the presence of a dispersed material, the precipitated silica in this case. The hydrodynamic effect is a function of the volume occupied by the filler and can be estimated by, for example, the Guth and Gold equation as follows:

$$G'_{filled} = G'_{polymer}(1 + 2.5\phi + 14.1\phi^2)$$

where $G'_{polymer}$ is the modulus of the entangled polymer network, $G'_{filled}$ is the elastic modulus of the filled compound and $\phi$ is the volume fraction of the filler. The third and far the largest contributor to the modulus at low strain is the filler network which is a result of the strong filler-filler interaction. With increasing strain this filler network progressively brakes down and the G' modulus approaches the limiting value of $G'_{filled}$ given by the equation above. Hydrophobization of the precipitated silica surface by a low molecular weight additive will reduce filler-interaction and thereby result in a lower and less strain dependent G' modulus as indicated by the dashed line of FIG. 1. As long as the low molecular weight additive is chemically not attached to the polymer chain, the high strain limiting value remains the same. Examples of such low molecular weight chemicals are the traditional silane couplers in uncured rubber compounds. As in the uncured state they are chemically not attached to the polymer chain, they only bring a limited improvement in polymer-filler interaction.

In contrast to the above, attachment of polar groups, groups capable of hydrogen bonding of silica reactive groups to a polymer chain will not only reduce filler-filler interaction by hydrophobization of the silica surface but they also will substantially increase polymer-filler interaction via the entanglement of silica surface bound chains with the polymer network. As a result of the attachment of such groups to the polymer chain the rubber compound's G' modulus at low strains will be lower and at high strains will be higher compared to a rubber compound made with an elastomer having no such functional groups. This scenario is illustrated by the FIG. 2 where the solid line represents a compound (rubber composition) made with a polymer elastomer containing no functional groups and the dashed line represents a compound made with a polymer to which polar and/or silica reactive groups have been attached. The hydrophobization of the silica surface by the functional polymer results in a lower low strain modulus and the improved polymer-filler interaction in a higher high strain modulus. As a result the curve of the functional polymer containing compound crosses over the curve of the control compound.

From this description it follows that the filler flocculation and Payne effect measurements are excellent diagnostic tools to determine if silica reactive groups have successfully been attached to a polymer. Increase of filler-polymer interaction and decrease of filler-filler interaction typically also results in reduced hysteresis. This can be determined by measuring the tangent delta of the uncured or cured compound as this value is the ratio of lost and stored energy under cyclic deformation. A lower value indicating a decrease of lost energy and/or an increase of the stored energy.

The following Examples are presented to further illustrate the invention relating to organoaminoalkoxysilane modification of elastomer for precipitated silica reinforced rubber compositions.

EXAMPLE I

Purpose of this Example is to demonstrate that by the use of aminopropyl triethoxysilane (APT) filler-polymer interaction of a high vinyl, 3,4-polyisoprene (3,4-PI) can be improved and to provide evidence of it through oscillatory shear measurements showing that flocculation of the filler as well as Payne effect (the shear dependence of the storage modulus) can be reduced, and the high strain modulus can be increased by the addition of APT compared to the control compound made in the absence of APT.

3,4-polyisoprene rubber as Isogrip was obtained from Karbochem (PTY) Ltd. having about 60 percent 3,4-PI addition, Mooney viscosity (ML+4) of 65 to 70 and a $T_g$ (glass transition temperature) of about −10° C.

Rubber samples were prepared without APT and referred to as a Control rubber sample and with APT modifications of 1, 2.5, 5 and 8 phf (parts by weight per 100 parts by weight of precipitated silica filler).

The elastomers were functionalized by mixing it with APT, precipitated silica reinforcing filler and rubber processing oil together in an internal rubber mixer.

For the rubber compounds preparations, the 3,4-PI was first added to a 75 ml laboratory internal rubber mixer which was preheated to 150° C. Addition of 3,4-PI was followed by the addition of a mixture of 65 phr of precipitated silica (as Zeosil 165PM™ from Rhodia), 20 phr of rubber processing oil and the APT. These were mixed for 4 minutes using 60 rpm rotor speed. Final temperature was around 165° C. Subsequently the compounds were sheeted out in a press and were remixed for 3 minutes using the same conditions of the first mix. Compounds were sheeted out again in a press and were tested using an RPA (Rubber Process Analyzer) analytical instrument.

Filler flocculation was measured by recording the increase of torque (S') with time at 100° C., using a relatively low strain of 0.42 percent and 1 Hz oscillation frequency.

After heating the samples for 30 minutes at 100° C. a strain sweep was carried out at the same temperature followed by a strain sweep conducted at a lower temperature of 40° C. in order to determine the effect of APT on the strain dependence of storage modulus (G'), (Payne effect) and the magnitude of tangent delta.

Description of Drawings and Table

Figure 3:
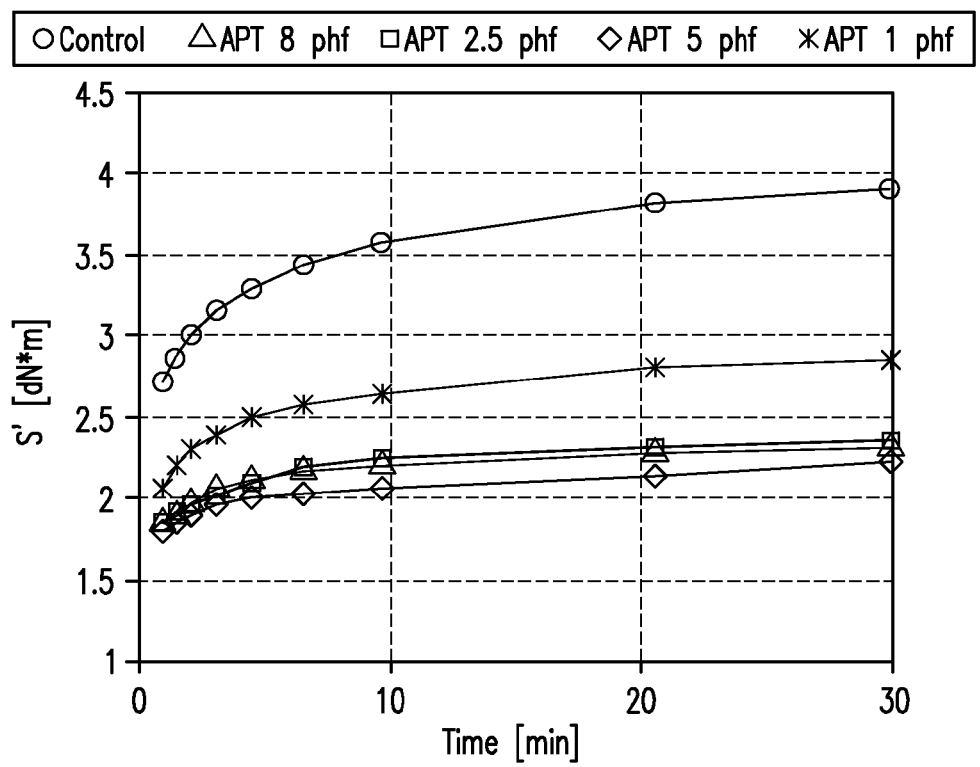
Figure 4:
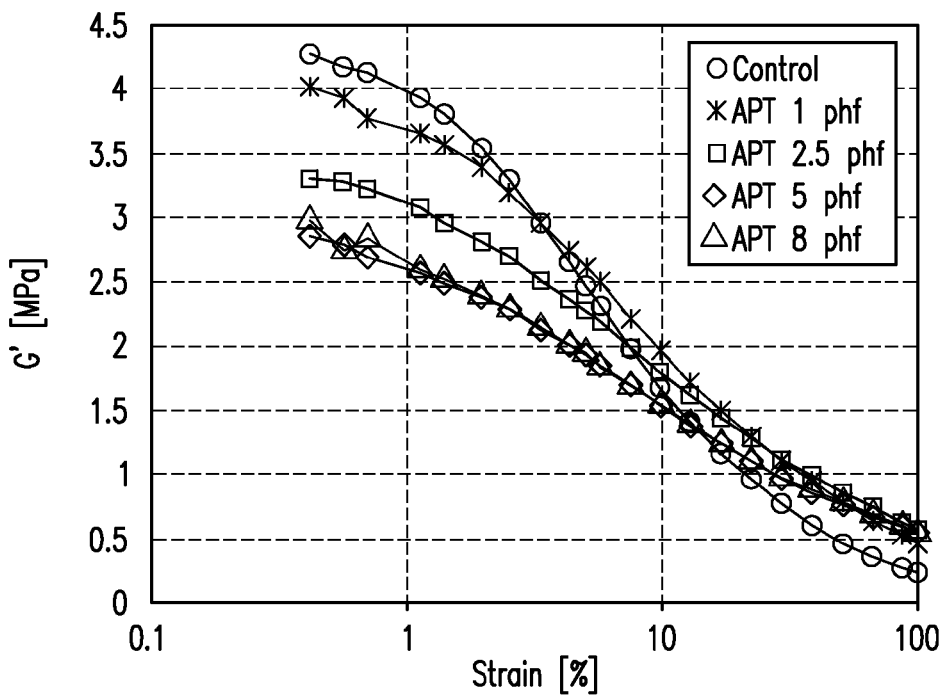
Figure 5:
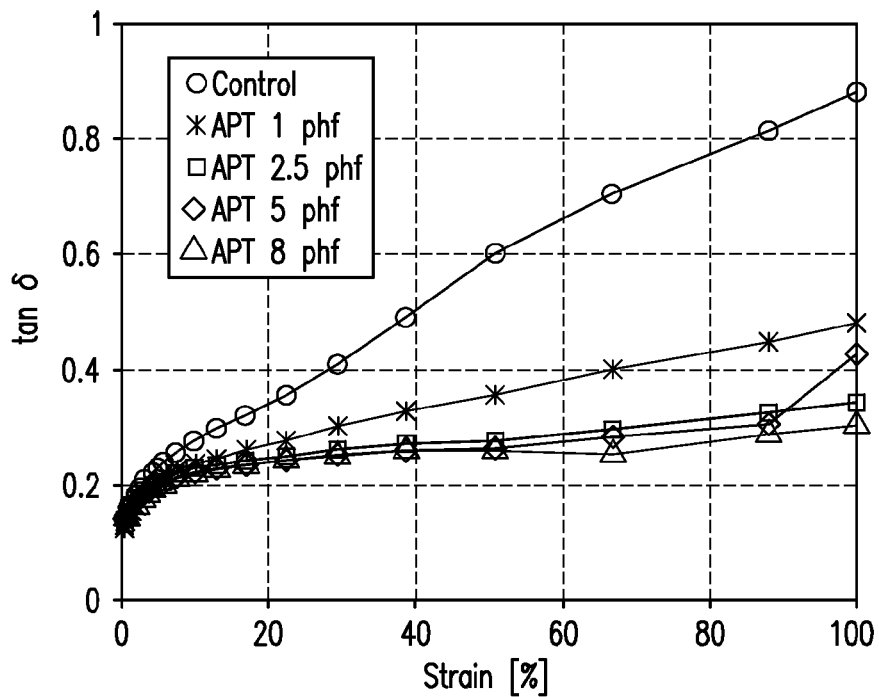

FIGS. 3, 4 and 5 (FIGS. 3, 4 and 5) are provided to graphically present the analytical results.

FIG. 3 is presented to show the effect of APT concentration in the rubber samples on the rate of filler flocculation in terms of the torque (S') increase as a function of time in minutes. FIG. 4 is presented to show the effect of APT concentration in the rubber samples including the control rubber composition without the APT and rubber compositions containing 1, 2.5, 5 and 8 phf (parts per 100 parts of filler, by weight) of the APT on the strain dependence of storage modulus G' measured at 40° C. FIG. 5 is presented to show the effect of increasing APT concentration on the magnitudes of tangent delta (which is a measure of the compound hysteresis) at different strains at 40° C.

In FIG. 3, the lower initial S' value of APT modified rubber samples compared to the control compound (made without the APT) shows that filler-filler interaction was reduced by APT treatment of the rubber and it resulted in a softer compound. Reduced filler-filler interaction is a result of the hydrophobization of the silica surface. As APT alone can not hydrophobate the surface efficiently due to the polar amino group at the end of the propyl spacer, significant hydrophobization could only occur by chemical attachment of the hydrophobic polymer chain to the silica surface. In addition to the lower initial torque, the slower rate of torque increase of APT modified rubber samples compared to the control compound is a clear indication of reduced filler-filler interaction which in case of APT could only be achieved by creating chemical bonding between the polymer chain and the silica particle.

FIG. 4 clearly demonstrates that the addition of APT results in a decrease of the modulus at low amplitude strains and in an increase of modulus at high amplitude strains relative to the control compound made without APT. These changes result in a crossover of the respective G' values. As discussed previously and demonstrated by FIG. 1, decrease of the low amplitude strain is a result of the hydrophobization of the silica surface which in turn reduces filler-filler interaction. As APT on its own would not be able to hydrophobate the precipitated silica surface due to its polar nature, the observed changes can only be explained via the reaction of APT with the polymer and the attachment of the resulting functional polymer to the silica surface. However, hydrophobization on its own would not result in an increase of the high amplitude strain in case of precipitated silica filler as the polymer interaction with the hydrophobated surface would be governed by weak Wan der Waals forces. In the next example it will be demonstrated that low molecular weight silane couplers can only decrease the low amplitude modulus (LAM) and they have little or no impact on the high amplitude modulus (HAM) in uncured compounds. In contrast hydrophobization by high molecular weight functional polymers will increase HAM by the increase of their effective volume via the increase of bound rubber and more importantly via entanglements forming between the filler surface bound polymer and the polymer matrix. This in turn increases the elasticity of the polymer layer surrounding the filler and results in increased storage modulus which is the measure of the magnitude of elastic deformation under strain.

One of the practical importances of the hydrophobization of the silica surface as well as the use of functional polymers capable to react with the hydroxyl groups of the silica is the reduction of the rolling resistance of the tire by reducing the hysteresis of the compound. One measure of compound hysteresis is tangent delta derived from oscillatory shear measurement conducted at the typical operating temperature of a tire and is derived from the ratio of the loss (G") and elastic (G') moduli. FIG. 5 shows that by the addition of APT hysteresis of compound as measured by tangent delta could be significantly reduced in a broad range of strain amplitude.

Table 1.1 lists the related key indicators of the observed changes, namely LAM/HAM, HAM and tangent delta values measured at 5 and 20 percent strains. The term "LAM" means the low amplitude modulus which in this case is the value of modulus measured at 0.42 percent amplitude of strain and the term "HAM" means the high amplitude modulus which in this case refers to the modulus value measured at 100 percent amplitude of strain. The ratio of LAM and HAM is used as a numeric measure of the Payne effect, the decrease of modulus with increasing amplitude of the strain. A decrease of the LAM/HAM ratio represents a decrease of the Payne effect. The separately listed HAM value clearly shows the increase of this value with increasing APT concentration up to 2.5 phf. The more than two fold increase of the high amplitude modulus is a clear indication of the significant increase of polymer-filler interaction achieved by the use of APT. Parallel with the increase of HAM, tangent delta decreases an its decrease also plateaus out at around 2.5 phf content. Reaching a plateau in case of all parameters indicates that reactive sites of the polymer is limited and it is regulated by the amount of oxygenated sites forming on the chain by thermal oxidation during the mixing cycle which ultimately is a function of time and temperature.

TABLE 1.1

Effect of APT Modification of 3,4-polyisoprene rubber on Key Rheological Indicators of Uncured Rubber Compositions Measured at 40° C.

|  | Control | APT 1 phf | APT 2.5 phf | APT 5 phf | APT 8 phf |
|---|---|---|---|---|---|
| LAM (0.42%)/ HAM (100%) | 18.3 | 8.7 | 5.8 | 5.3 | 5 |
| HAM (kPa) | 229 | 452 | 560 | 525 | 546 |
| Tan Delta at 5% |  |  |  |  |  |
| Value | 0.23 | 0.203 | 0.201 | 0.2 | 0.198 |
| Percent | 100 | 88 | 88 | 87 | 86 |
| Tan Delta at 20% |  |  |  |  |  |
| Value | 0.357 | 0.276 | 0.248 | 0.241 | 0.245 |
| Percent | 100 | 77 | 70 | 68 | 68 |

From this Example I, it is concluded that, insofar as functionalization of the elastomer with the organoaminoalkoxysilane is concerned, treatment of 3,4_PI with APT results in improved polymer-filler interaction which can only be explained by the assumption that a chemical reaction takes place between the polymer and APT. Subsequently or prior to this reaction, the pendant APT groups react with the hydroxyl groups of the precipitated silica surface and does creates a chemical bond between the polymer and the silica particle.

EXAMPLE II

Comparison of APT to Traditional Silane Couplers

Comparisons of APT modified 3,4-polyisoprene rubber and control rubber made in the absence of APT with 3,4-polyisoprene rubber treated with traditional silica coupling agents were undertaken.

For this comparison, two control rubber compositions were prepared. One comprised of 3,4-polyisoprene rubber, 65 phr of precipitated silica as the Zeosil 165MP™ from Rhodia, and 20 phr of rubber processing oil. This rubber composition is referred to as a control. The second rubber composition comprised of 3,4-polyisoprene rubber, 8 phf (parts per 100 parts of filler) APT, 65 phr of precipitated silica as the Zeosil 165MP™ from Rhodia, and 20 phr of rubber processing oil. This rubber composition is referred to as APT modified sample or APT 8 phf.

In addition two experimental rubber compositions were made using 3,4-polyisoprene rubber, 65 phr of precipitated silica as the Zeosil 165MP™ from Rhodia, and 20 phr of rubber processing oil.

For one of the experimental rubber compositions 8 phf of a silica coupler comprised of a bis(3-triethoxysilylpropyl) polysulfide was used having an average connecting sulfur atoms in its polysulfidic bridge in a range of from about 2 to about 2.6 was used as Si266™ from Evonic. This rubber composition is referred to as Si266™ 8 phf.

For the other experimental rubber composition 8 phf of a silica coupler comprised of a bis(3-triethoxysilylpropyl) polysulfide was used having an average connecting sulfur atoms in its polysulfidic bridge in a range of from about 3.4 to about 3.8 was used as Si69™ from Evonic. This rubber composition is referred to as Si69™ 8 phf.

Rubber compositions of this example were made using the procedure described in Example I.

Description oF Drawing

Figure 6:
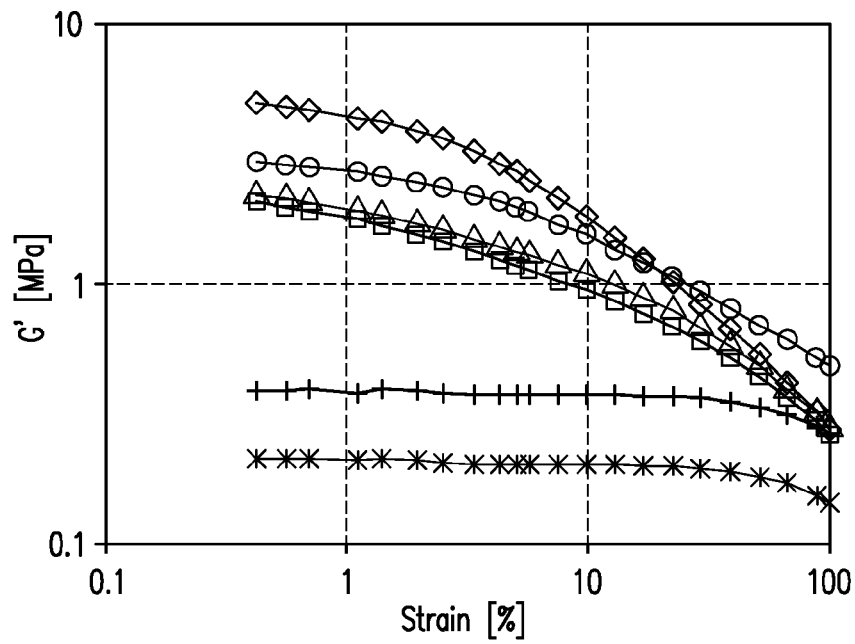

FIG. 6 (FIG. 6) is provided as a graphical log-log plot of storage modulus (G') versus percent strain amplitude recorded at 1 Hz and 40° C. which provides a clearer evidence of the chemical nature of the increased filler activity achieved by the use of APT as compared to use of each of the two more traditional silica couplers.

Figure 7:
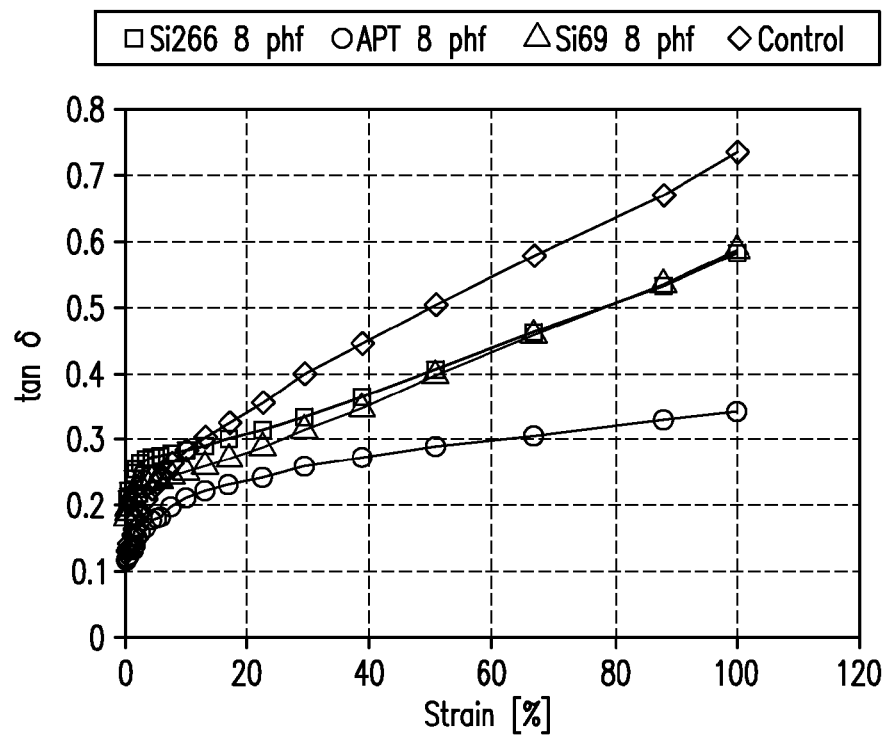

FIG. 7 (FIG. 7) is a plot of the tangent delta as a function of strain amplitude derived from oscillatory shear measurements of the rubber compositions of this example conducted at 40° C. using 1 Hz frequency. FIG. 7 is presented to compare the effect of APT with traditional silane couplers in terms of compound hysteresis a measure of which is tangent delta.

In FIG. 6 it is seen that the use of traditional silica couplers reduced more the low strain modulus (storage modulus G') than it could be achieved by use of APT at the same level of loading. However, it can also be seen that the storage modulus G' curves, or lines, of these traditional silica coupler-containing rubber compositions do not cross over the storage modulus G' curve, or line, of the control rubber composition which was made in the absence of APT. The lines approach about the same modulus value at high amplitude strains. In contrast the rubber composition made with 8 phf APT has a higher HAM value and thereby it's G' curve crosses over that of the control compound as well as that of the experimental rubber composition which were made using the traditional silane couplers, Si69™ and Si266™. This is an indirect evidence that an APT treatment of the 3,4-PI rubber in the mixer resulted in a chemical bonding between the polymer and the filler.

The degree of filler-polymer interaction can be assessed by determining the polymer network and hydrodynamic contributions to the elastic modulus as discussed previously. This was done by measuring the $G'_{Polymer}$ of the 3,4-polyisoprene rubber mixed with oil only as a function of strain. The result of the strain sweep is shown in the previously presented FIG. 6. The hydrodynamic effect of filler was estimated using the equation of Guth and Gold (see equation (1)) and estimated value is also shown on FIG. 6.

Quite interestingly the high amplitude modulus (HAM) of the control compound and the compounds containing the more traditional silica couplers are about the same as the calculated $G'_{Filled}$ value which is a measure of the combined contribution of the polymer network and the filler volume (hydrodynamic effect) to the modulus but contains no element related to the polymer-filler interaction. This implies that the polymer-filler interaction in these cases is negligible. Only the APT modified polymer shows a HAM value exceeding the calculated $G'_{Filled}$ value, indicating increased polymer-filler interaction by chemical rather than physical means.

FIG. 7 provides clear evidence that the uncured rubber composition made with APT is significantly less hysteretic than the control rubber composition and more importantly, than the rubber compositions made with traditional silane couplers as evidenced by the lower tangent delta of the APT modified sample compared to the others.

Table 2.1 is provided in order to give a quantitative comparison of the differences between the rubber compositions of this example. According to the LAM/HAM values addition of APT, Si69™, and Si266™ resulted in a significant reduction in the strain dependence of the storage modus. The second column of Table 2.1 lists the modulus of compounds measured at a high, 100 percent strain amplitude (HAM (100 percent)). Values clearly show that the APT compound has a significantly higher modulus at high strain which is considered as proof of the significantly higher polymer-filler interaction compared to the control compound as well as the traditional silane modified rubber compositions. The HAM (100 percent) values of the control compound made in the absence of APT or silane coupler is similar to that of the rubber compositions containing the traditional silane couplers. It shows that hydrophobization of the silica surface using a low molecular weight traditional silane coupler does not lead to a substantial increase of the HAM of an uncured rubbery composition, i.e., to an increase of polymer-filler interaction.

The measured tangent delta value of the APT modified sample is also significantly lower than that of the control compound or the rubber compositions made with Si69™, and Si266™ indicating that compound hysteresis is more effectively reduced by APT functionalization of the rubber than by its hydrophobization by traditional silane coupler.

Comparison of rubber compounds made with APT, Si69™, Si266™ and a control compound made in the absence of these.

TABLE 2.1

|  | Control | Si69 8 phf | Si266 8 phf | APT 8 phf |
|---|---|---|---|---|
| LAM (0.42%/HAM (100%)) | 18 | 8 | 7.9 | 6.2 |
| HAM (100%) (kPa) | 275 | 283 | 261 | 476 |
| Tan Delta at 5% | | | | |
| Value | 0.235 | 0.242 | 0.274 | 0.181 |
| Percent | 100 | 103 | 117 | 77 |
| Tan Delta at 20% | | | | |
| Value | 0.357 | 0.292 | 0.315 | 0.243 |
| Percent | 100 | 82 | 88 | 68 |

(RPA Strain Sweep, 40° C., 1 Hz)

EXAMPLE III

Effect of Amine Based Stabilizer

The purpose of this example is to demonstrate that addition of an amine type stabilizer along with APT retards the ability of APT to improve polymer-filler interaction.

For this purpose, a control rubber composition was prepared comprised of 3,4-polyisoprene rubber, 65 phr of precipitated silica as the Zeosil 165MP™ from Rhodia, and 20 phr of rubber processing oil. This rubber composition is referred to as control.

In addition two experimental rubber compositions were made using 3,4-polyisoprene rubber, 65 phr of precipitated silica as the Zeosil 165MP™ from Rhodia, and 20 phr of rubber processing oil.

To one of the experimental rubber compositions 2 phf of APT was added and this sample is referred to as 2 phf APT.

To the other experimental rubber composition 3 phr N-(1, 3-dimethylbutyl) N'-phenyl-p-phenylenediamine (6DPP) was added along with 2 phf of APT. This experimental rubber composition is referred to as 2 phfAPT+3 phr6DPP.

Rubber compositions of this example were made using the procedure described in Example I.

Description of Accompanying Drawings

Figure 8:
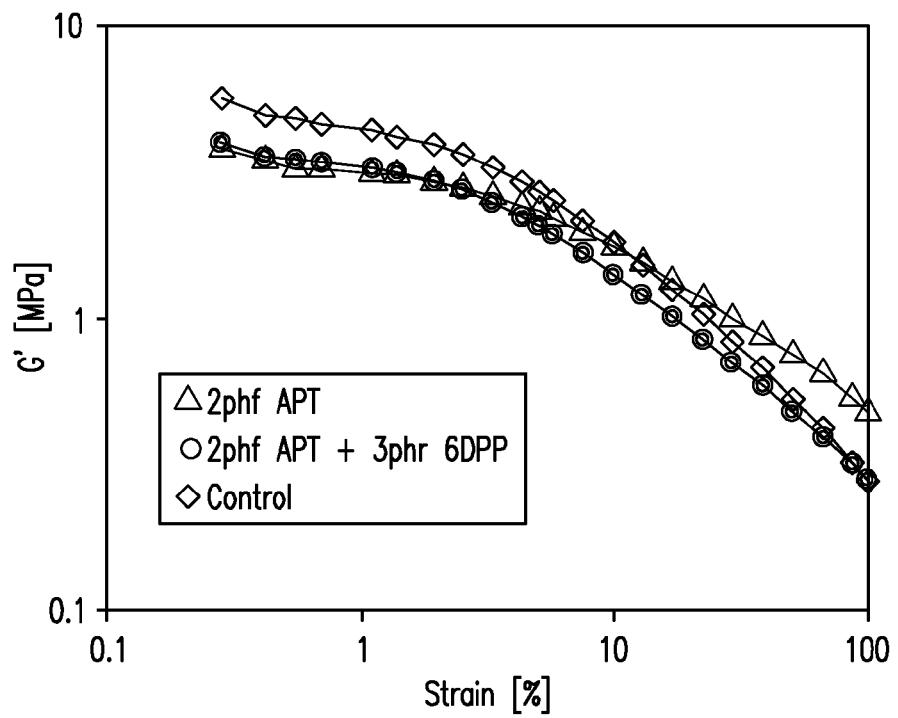

FIG. 8 (FIG. 8) is provided as a graphical log-log plot of storage modulus (G') versus percent strain amplitude recorded at 1 Hz and 40° C. FIG. 8 demonstrates that the addition of APT results in a decrease of the modulus at low amplitude strains and in an increase of modulus at high amplitude strains relative to the control compound made without APT. These changes result in a crossover of the respective G' values and it is an indication of improved polymer-filler interaction. FIG. 8 also shows that this crossover diminishes as a result of adding the amine type stabilizer, 6DPP in addition to the 2 phf APT indicating that 6DPP prevented the formation of strong polymer-filler bonding.

Table 3.1 shows that addition of 2 phf APT to the rubber compound results in a reduced Payne effect (LAM/HAM ratio), a close to doubled high amplitude modulus (HAM) and a significant reduction of tangent delta measured at 5 percent and 20 percent strain. All these are a result of increased polymer-filler interaction. However, as 6DPP added to the first nonproductive mix along with APT Payne effect reduction becomes less pronounced, the HAM value becomes close to equal to that of the control compound and reduction of tangent delta becomes less significant. This example clearly demonstrates that the desirable rheological changes indicating better rolling resistance for a tire made with a tread of such rubber composition are reduced by adding 6DPP along with APT in the initial nonproductive step. With other words 6DPP retards the functionalization of the polymer chain by APT either by retarding the oxidation process of the polymer chain or by competing with the amino group of APT in its reaction with the oxygenated entities forming via thermal oxidation.

Comparison of rheological properties of rubber compounds made with APT, APT and 6DPP and a control compound made in the absence of these.

TABLE 3.1

|  | Control | APT 2 phf | APT 2 phf and 1.3 phr 6DPP |
|---|---|---|---|
| LAM (0.42%/HAM (100%)) | 18 | 7.2 | 12.6 |
| HAM (100%) (kPa) | 275 | 493 | 281 |
| Tan Delta at 5% | | | |
| Value | 0.235 | 0.173 | 0.201 |
| Percent | 100 | 74 | 86 |
| Tan Delta at 20% | | | |
| Value | 0.357 | 0.248 | 0.291 |
| Percent | 100 | 69 | 82 |

(RPA Strain Sweep, 40° C., 1 Hz)

EXAMPLE IV

Functionalization of a combination of cis 1,4-polybutadiene and styrene/butadiene elastomers were evaluated in an optional presence of an amine based rubber stabilizer.

In particular, the amine based stabilizer was added in various stages of mixing of the rubber composition to evaluate the effect on various physical properties of the rubber composition.

The following Table 4.1 illustrates the basic formulation of the rubber compositions. The parts and percentages, where used, are by weight unless otherwise indicated.

For this study, the rubber compositions were prepared with four separate, sequential stages of mixing of ingredients in an internal laboratory rubber mixer, namely three sequential non-productive mixing stages, or steps, followed by a productive mixing stage.

For the first two non-productive mixing stages, the mixing was conducted until about 170° C. was reached and rubber composition then discharged from the rubber mixer with mixing times in a range of from about 4.5 to about 5 minutes. For the third non-productive mixing step, the ingredients were mixed to about 160° C. for a mix time of about 2.7 minutes. For the final productive mixing step, the ingredients, including sulfur curatives, were mixed to about 110° C. for about 2.5 minutes. Between mixing steps, the rubber was cooled to below about 50° C. and refined on a warm mill. A philosophy of mixing rubber compositions in sequential non-productive (without sulfur curative) followed by a productive mixing step is well known those having skill in such art.

TABLE 4.1

| First non-productive mixing step (NP1) (170° C.) | |
|---|---|
| Cis 1,4-polybutadiene rubber (BR)[1] | 30 |
| Styrene/butadiene rubber, oil extended (S-SBR)[2] (plus 26.3 parts extender oil) | 70 |
| Rubber processing oil and microcrystalline wax | 7.5 |
| Amine based rubber stabilizer[3] | Varied |
| Fatty acid[4] | 2 |
| Precipitated silica[5] | 50 |
| Triethoxysilyl propyl amine[6] | Varied |
| Second non-productive mixing step (NP2)(170° C.) | |
| Amine based rubber stabilizer[3] | Varied |
| Precipitated silica[5] | 30 |
| Silica coupling agent[7] | 6 |
| Triethoxysilyl propyl amine[6] | Varied |
| Third non-productive mixing step (NP3)(160° C.) | |
| Rubber reinforcing carbon black (N299)[8] | 6.4 |
| Amine based rubber stabilizer[3] | Varied |
| Productive mixing step (P) | |
| Rubber antidegradant[9] | 0.8 |
| Zinc oxide | 2.5 |
| Sulfur, insoluble | 2.2 |
| Sulfur cure accelerators[10] | 3.7 |
| Sulfur cure retarder (salicylic acid) | Varied |

[1]Cis 1,4-polyisoprene rubber as Budene ® 1207 from The Goodyear Tire & Rubber Company
[2]Solution polymerization prepared styrene/butadiene rubber (S-SBR) containing about 30 percent bound styrene and having a vinyl content of about 42 percent as SLF30H41 from The Goodyear Tire & Rubber Company
[3]Comprised of N-(1,3-dimethylbutyl) N'-phenhyl-p-phenylenediamine
[4]Comprised of stearic acid, palmitic acid and oleic acid
[5]Precipitated silica as Zeosil ® MP1165 from Rhodia
[6]Triethoxylsilyl propyl amine from the Gelest, Inc. Company
[7]Comprised of bis(3-triethoxysilylpropyl) disulfide
[8]N299 carbon black, an ASTM designation
[9]Poly(1,2-dihydro-2,2,4-trimethylquinoline)
[10]Combination of sulfenamide and diphenyl guanidine sulfur cure accelerators Various physical properties of the rubber compositions are reported in the following Table 4.2 along with the addition point and amount (parts per hundred parts of rubber by weight) of ingredients marked as variable in Table 4.1.

TABLE 4.2

| | Mixing Stage | Rubber Samples (phr) | | | |
|---|---|---|---|---|---|
| Material | | A | B | C | D |
| Amine based rubber stabilizer | NP1 | 0 | 0 | 0 | 2 |
| Triethoxysilyl propyl amine | NP1 | 0 | 0.8 | 0.8 | 0.8 |
| Amine based rubber stabilizer | NP2 | 2 | 0 | 2 | 0 |
| Triethoxysilyl propyl amine | NP2 | 0 | 0.5 | 0.5 | 0.5 |
| Amine based rubber stabilizer | NP3 | 0 | 2 | 0 | 0 |
| Salicylic acid retarder | P | 0 | 0.8 | 0.8 | 0.8 |
| Properties | | | | | |
| Stress-Strain | | | | | |
| M100 MPa | | 2.47 | 2.6 | 2.73 | 2.68 |
| M300 MPa | | 11.9 | 14.1 | 14 | 13.6 |
| M300/M100 | | 4.8 | 5.4 | 5.1 | 5.1 |
| Rebound | | | | | |
| 23° C. | | 31 | 35 | 32 | 32 |
| 100° C. | | 64 | 69 | 65 | 65 |
| Dynamic Properties | | | | | |
| Tangent delta[1] | | | | | |
| 50° C., 10 Hertz, 5% strain | | 0.216 | 0.183 | 0.205 | 0.201 |
| 0° C., 10 Hertz, 0.1% strain | | 0.252 | 0.281 | 0.257 | 0.272 |
| Abrasion resistance (DIN)[2] | | | | | |
| Relative volume loss | | 120 | 114 | 113 | 118 |

[1]ASTM D5992 (DIN53513)
[2]DIN 53516

The rubber compositions of this example are identified as Samples A through D. Sample A is considered as control without the use of aminosilane. Sample B was prepared in accordance to the recommended best practice of this invention wherein the amine type stabilizer (6DPP) was added in the third nonproductive step in order to avoid its interference with the functionalization reactions when APT is introduced along with precipitated silica in the first and second nonproductive steps.

From the comparison of Sample A and B it is clearly evident that, when an aminosilane is used, higher modulus and M300/M100 ratios are obtained. The addition of aminosilane also lowers the abrasion weight loss. These physical property changes upon addition of aminosilane are predictive of greater strength and abrasion resistance performance for the cured rubber composition. Such composition would be expected to provide improved treadwear when used as tire treads.

In addition, it is also evident, when aminosilane is used, higher room temperature and 100° C. rebound values are obtained and lower tangent delta values at 50° C. These are predictive of lower hysteresis for the cured rubber composition. Such composition would be expected to provide improved (reduced) rolling resistance.

Furthermore the low temperature (0° C.) tangent delta (a lab indicator of wet performance) of the aminosilane modified sample is higher. This is indicating an increased ability of the compound to dissipate energy at this temperature. Such composition would be expected to provide improved wet traction when used as tire tread.

Samples C and D of this example were prepared by adding the amine type stabilizer in the second and first non productive stages respectively. Comparison of Samples B through D clearly indicates that addition of the amine type stabilizer in the same step when APT and precipitated silica are introduced results in a reduction of beneficial changes. It is most evident from the rolling resistance lab indicators, i.e., the room temperature and 100° C. rebound and 50° C. tangent delta values. However, it also has some negative effect on the modulus and 300M/100M ratio, on the abrasion resistance as well as on the low temperature tangent delta. Furthermore it can be seen from the comparison of Samples B through D, that the least improvement of these rolling resistance, wear and wet traction lab indicators was obtained when the amine type stabilizer was added to the first nonproductive mix stage while its addition to the second non productive step gave somewhat better combination of results. This is due to the fact that addition of the amine type stabilizer to the second non-productive step allowed some functionalization and polymer-filler reaction to take place in the first nonproductive mixing step.

EXAMPLE V

In this Example, the effect of non-productive mixing temperature is evaluated for functionalization of a combination of cis 1,4-polybutadiene and styrene/butadiene elastomers.

In particular, non-productive mixing temperatures were varied for the non-productive mixing stages as indicated in Table 5.1.

The basic formulation for the rubber compositions is shown by Table 5.1. The parts and percentages, where used, are by weight unless otherwise indicated. The rubber compositions of this example (Sample E and F) were made using formulation of Sample B of Example IV. The only difference between Samples B, E and F is the discharge temperature of the first two non productive mixing steps (NP1 and NP2). In case of Sample B NP1 and NP2 mixes were discharged at 170° C., in case of Sample E at 160° C., and in case of Sample F at 150° C.

Measured physical properties of the rubber compositions of Samples B, E, and F are listed in Table 5.2. Physical properties of the control rubber composition of Example 4 (Sample A) made in the absence of aminopropyl triethoxysilane was also included in Table 5.1 to aid comparison.

From the comparison of the physical properties of samples of Table 5.1 it is clearly evident that key tire performance lab indicators of the aminosilane modified samples substantially improve with increasing discharge temperature of NP1 and NP2 mixes. These changes are the increase of 300 percent modulus and M300/M100 ratio, the increase of room temperature and 100° C. rebound values, the decrease of the tangent delta measured at 50° C., the increase of tangent delta measured at 0° C. and the reduction of the abradability of the sample. These physical property changes upon increasing discharge temperature of the aminosilane modified samples are predictive of greater strength and abrasion resistance performance, lower hysteresis for the cured rubber composition at room temperature and 50° C., and higher hysteresis at 0° C. for the cured rubber compounds. Such composition would be expected to provide improved tread wear, reduced rolling resistance and improved wet traction when used as tire treads.

The aminosilane modified Sample F mixed to 150° C. in the first two non productive mixes show only marginal improvement over the control Sample A made without the aminosilane. In contrast the aminosilane modified Sample B shows substantial improvement over the control sample A. Physical properties of the aminosilane modified Sample E mixed up to 160° C. falls in between Samples F and B. From the data it is quite clear that dump temperature of the initial non productive steps, wherein APT is added along with the precipitated silica, should be at least 160° C. and preferentially 170° C.

TABLE 5.1

First and second non-productive mixing step (NP1 and NP2)
(160° C. for Sample E and 150° C. for Sample F)

| First non-productive mixing step (NP1). | |
|---|---|
| Cis 1,4-polybutadiene rubber (BR)[1] | 30 |
| Styrene/butadiene rubber, oil extended (S-SBR)[2] (plus 26.3 parts extender oil) | 70 |
| Rubber processing oil and microcrystalline wax | 7.5 |
| Amine based rubber stabilizer[3] | 0 |
| Fatty acid[4] | 2 |
| Precipitated silica[5] | 50 |
| Triethoxysilyl propyl amine[6] | 0.8 |
| Second non-productive mixing step (NP2) | |
| Amine based rubber stabilizer[3] | 0 |
| Precipitated silica[5] | 30 |
| Silica coupling agent[7] | 6 |
| Triethoxysilyl propyl amine[6] | 0.5 |
| Third non-productive mixing step (NP3) | |
| Rubber reinforcing carbon black (N299)[8] | 6.4 |
| Amine based rubber stabilizer[3] | 2 |
| Productive mixing step (P) | |
| Rubber antidegradant[9] | 2.5 |
| Sulfur, insoluble | 2.2 |
| Sulfur cure accelerators[10] | 3.7 |
| Sulfur cure retarder (salicylic acid) | 0.8 |

The materials are those recited in Table 4.1 unless otherwise mentioned.

Various physical properties of the rubber compositions are reported in the following Table 5.2.

TABLE 5.2

| | Mixing Stage | Rubber Samples (phr) | | | |
|---|---|---|---|---|---|
| | | B | E | F | A |
| Discharge Temperatures (° C.) | | | | | |
| Discharge temperature | NP1 | 170 | 160 | 150 | 170 |
| Discharge temperature | NP2 | 170 | 160 | 150 | 170 |
| Discharge temperature | NP3 | 160 | 160 | 160 | 160 |
| Discharge temperature | P | 110 | 110 | 110 | 110 |
| Properties Stress-Strain | | | | | |
| M100, MPa | | 2.6 | 2.77 | 2.67 | 2.47 |
| M300, MPa | | 14.1 | 13.7 | 13.2 | 11.9 |
| M300/M100 | | 5.4 | 5 | 4.9 | 4.8 |
| Rebound | | | | | |
| 23° C. | | 35 | 33 | 31 | 31 |
| 100° C. | | 69 | 65 | 63 | 64 |
| Dynamic Properties Tangent delta[1] | | | | | |
| 50° C., 10 Hertz, 5% strain | | 0.183 | 0.204 | 0.217 | 0.216 |

TABLE 5.2-continued

| | Mixing | Rubber Samples (phr) | | | |
|---|---|---|---|---|---|
| | Stage | B | E | F | A |
| 0° C., 10 Hertz, 0.1% strain | | 0.281 | 0.265 | 0.246 | 0.252 |
| Abrasion resistance (DIN)², relative volume loss | | 114 | 123 | 128 | 120 |

[1]ASTM D5992 (DIN53513)
[2]DIN 53516

While certain representative embodiments and details have been shown for the purpose of illustrating the subject invention, it will be apparent to those skilled in this art that various changes and modifications can be made therein without departing from the scope of the subject invention.

What is claimed:

1. A method of preparing a rubber composition comprises:
   (A) providing a blend comprised of, based on parts by weight per 100 parts by weight rubber (phr):
      (1) at least one sulfur vulcanizable diene-based elastomer, wherein said at least one of said diene-based elastomer(s) contains oxidative derived components randomly distributed on its elastomer chain by thermal oxidation comprised of at least one of aldehydes, ketones and epoxides;
      (2) from about 30 to about 150 phr of reinforcing filler comprised of
         a combination of precipitated silica and rubber reinforcing carbon black which contains at least about 30 phr of precipitated silica, together with a silica coupler for said precipitated silica having a moiety reactive with hydroxyl groups on said precipitated silica and another, different, moiety interactive with said diene-based elastomer(s),
   (B) functionalizing at least one of said diene-based elastomers containing said oxidative derived components with a functionalizing compound having a moiety capable of reacting with at least one of said oxidative derived components on said elastomer chain and another different moiety capable of reacting with hydroxyl groups on said precipitated silica by:
      (1) pretreatment of said oxidative component containing elastomer(s) with said functionalizing compound to form a functionalized elastomer thereof followed by mixing said functionalized elastomer with said rubber composition, or
      (2) treatment of said oxidative derived components contained on said elastomer(s) with said functionalizing compound in situ within said rubber composition to form a functionalized elastomer;
   wherein said functionalizing of said oxidative component containing elastomer(s) is conducted in the absence of compound(s) competing with said functionalization comprised of:
      (3) compound(s) containing at least one of primary and secondary amine groups,
      (4) compound(s) containing stable free radicals, and
      (5) compound(s) containing peroxide decomposing moieties;
   (C) Followed by blending with said rubber composition containing said functionalized elastomer(s) at least one compound containing at least one of primary and secondary amine groups;
   wherein said functionalizing compound for functionalizing said diene-based elastomer is an organoaminoalkoxysilane comprised of the general structural formula (II):

(II)

wherein $R^1$, $R^2$ and $R^3$ are independently selected from the group consisting of alkoxy radicals having from 1 to 8 carbon atoms, with the proviso that at least one of $R^1$, $R^2$ and $R^3$ is an ethoxy radical; $R^4$ is an alkylene group which contains from 1 through 8 carbon atoms; and $R^5$ is selected from the group consisting of hydrogen and alkyl groups having from 1 to 15 carbon atoms.

2. The method of claim 1 wherein $R^5$ is hydrogen.

3. The method of claim 1 wherein said organoaminoalkoxysilane is comprised of at least one of aminopropyl triethoxysilane, trimethoxysilyl ethyl amine, triethoxysilyl ethyl amine, tripropoxysilyl ethyl amine, tributoxysilyl ethyl amine, trimethoxysilyl propyl amine, triethoxysilyl propyl amine, tripropoxysilyl propyl amine, triisopropoxysilyl propyl amine, tributoxysilyl propyl amine, trimethoxysilyl butyl amine, triethoxysilyl butyl amine, tripropoxysilyl butyl amine, tributoxysilyl butyl amine, trimethoxysilyl pentyl amine, triethoxysilyl pentyl amine, tripropoxysilyl pentyl amine, tributoxysilyl pentyl amine, trimethoxysilyl hexyl amine, triethoxysilyl hexyl amine, tripropoxysilyl hexyl amine, tributoxysilyl hexyl amine, trimethoxysilyl heptyl amine, triethoxysilyl heptyl amine, tripropoxysilyl heptyl amine, tributoxysilyl heptyl amine, trimethoxysilyl octyl amine, triethoxysilyl octyl amine, tripropoxysilyl octyl amine, tributoxysilyl octyl amine.

4. The method of claim 1 wherein said organoaminoalkoxysilane is comprised of triethoxysilyl propyl amine.

5. A rubber composition prepared by the method of claim 1 as a sulfur cured rubber composition.

6. A rubber composition prepared by the method of claim 2 as a sulfur cured rubber composition.

7. A rubber composition prepared by the method of claim 3 as a sulfur cured rubber composition.

8. A rubber composition prepared by the method of claim 4 as a sulfur cured rubber composition.

9. A tire having a component comprised of the rubber composition of clam 5.

10. A tire having a component comprised of the rubber composition of claim 6.

11. A tire having a component comprised of the rubber composition of claim 7.

12. A tire having a component comprised of the rubber composition of claim 8.

* * * * *